United States Patent
Lee et al.

(10) Patent No.: US 12,530,304 B2
(45) Date of Patent: Jan. 20, 2026

(54) STORAGE DEVICE FOR COMPRESSING AND STORING JOURNAL, AND OPERATING METHOD THEREOF

(71) Applicant: SK hynix Inc., Gyeonggi-do (KR)

(72) Inventors: Kwang Hun Lee, Gyeonggi-do (KR); In Sung Song, Gyeonggi-do (KR); Chul Woo Lee, Gyeonggi-do (KR); Jin Won Jang, Gyeonggi-do (KR); Jae Hoon Heo, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 92 days.

(21) Appl. No.: 18/354,663

(22) Filed: Jul. 19, 2023

(65) Prior Publication Data

US 2024/0330197 A1    Oct. 3, 2024

(30) Foreign Application Priority Data

Apr. 3, 2023    (KR) ........................ 10-2023-0043278

(51) Int. Cl.
  *G06F 3/00*    (2006.01)
  *G06F 12/00*   (2006.01)
  *G06F 12/10*   (2016.01)
(52) U.S. Cl.
  CPC .................................. *G06F 12/10* (2013.01)
(58) Field of Classification Search
  CPC ....................................................... G06F 12/10
  USPC ....................................................... 711/202
  See application file for complete search history.

(56) References Cited

U.S. PATENT DOCUMENTS

| | | | | |
|---|---|---|---|---|
| 7,433,898 | B1 * | 10/2008 | Georgiev | G06F 21/6218 |
| | | | | 707/999.009 |
| 9,170,938 | B1 * | 10/2015 | Walsh | G06F 3/0619 |
| 9,251,067 | B1 * | 2/2016 | Tomlin | G06F 12/10 |
| 9,268,682 | B2 * | 2/2016 | Tomlin | G06F 12/0246 |
| 9,489,296 | B1 * | 11/2016 | Tomlin | G06F 12/0253 |
| 9,495,288 | B2 * | 11/2016 | Cohen | G06F 3/064 |
| 9,507,523 | B1 * | 11/2016 | Mullendore | G06F 3/0604 |
| 10,114,581 | B1 * | 10/2018 | Natanzon | G06F 3/065 |
| 10,126,946 | B1 * | 11/2018 | Natanzon | G06F 3/067 |
| 10,235,092 | B1 * | 3/2019 | Natanzon | G06F 3/065 |
| 10,289,321 | B1 * | 5/2019 | Baryudin | G06F 3/064 |
| 10,346,610 | B1 * | 7/2019 | Natanzon | G06F 3/0623 |
| 10,353,603 | B1 * | 7/2019 | Baruch | G06F 3/0619 |
| 10,423,634 | B1 * | 9/2019 | Shemer | G06F 16/2477 |
| 10,489,289 | B1 * | 11/2019 | Peterson | G06F 3/0652 |
| 10,613,973 | B1 * | 4/2020 | Baryudin | G06F 12/0246 |
| 10,776,211 | B1 * | 9/2020 | Natanzon | G06F 11/1464 |
| 11,010,054 | B1 * | 5/2021 | Himelstein | G06F 3/0685 |

(Continued)

FOREIGN PATENT DOCUMENTS

KR    10-2022-0130526 A    9/2022

*Primary Examiner* — Sheng Jen Tsai
(74) *Attorney, Agent, or Firm* — IP&T GROUP LLP (57) ABSTRACT

A storage device may generate a compression journal based on N target journals among a plurality of journals and store the compression journal in a memory in which the plurality of journals are stored. In this case, each of the plurality of journals may include a logical address area index, an old physical address area index, and a new physical address area index. The new physical address area indexes of target journals may be the same. In addition, the compression journal may include a new physical address area index common to the target journals.

20 Claims, 8 Drawing Sheets

(56) References Cited

U.S. PATENT DOCUMENTS

| | | | | |
|---|---|---|---|---|
| 11,132,140 B1* | 9/2021 | Benjamin | | G06F 3/0679 |
| 11,360,689 B1* | 6/2022 | Grunwald | | G06F 11/1484 |
| 11,392,295 B2* | 7/2022 | Kamran | | G06F 3/0659 |
| 11,429,308 B2* | 8/2022 | Kumar | | G06F 11/1471 |
| 11,789,822 B1* | 10/2023 | Dubeyko | | G06F 3/0656 |
| | | | | 711/103 |
| 11,841,801 B2* | 12/2023 | Tomlin | | G06F 3/0679 |
| 11,853,568 B2* | 12/2023 | Kamran | | G06F 3/0653 |
| 11,899,952 B2* | 2/2024 | Goss | | G06F 3/0613 |
| 12,147,694 B2* | 11/2024 | Tomlin | | G06F 3/0608 |
| 2006/0106891 A1* | 5/2006 | Mahar | | G06F 16/10 |
| | | | | 707/999.203 |
| 2007/0214195 A1* | 9/2007 | Mitaru | | G06F 16/1815 |
| 2009/0031142 A1* | 1/2009 | Halevi | | G06F 12/1408 |
| | | | | 713/190 |
| 2009/0158432 A1* | 6/2009 | Zheng | | G06F 21/53 |
| | | | | 726/24 |
| 2009/0307287 A1* | 12/2009 | Barsness | | G06F 16/24561 |
| 2012/0137299 A1* | 5/2012 | Moyer | | G06F 3/0613 |
| | | | | 718/102 |
| 2014/0082261 A1* | 3/2014 | Cohen | | G06F 3/0643 |
| | | | | 711/103 |
| 2014/0101369 A1* | 4/2014 | Tomlin | | G06F 12/0246 |
| | | | | 711/E12.008 |
| 2014/0258588 A1* | 9/2014 | Tomlin | | G06F 3/0607 |
| | | | | 711/103 |
| 2014/0281145 A1* | 9/2014 | Tomlin | | G06F 12/1081 |
| | | | | 711/103 |
| 2014/0325117 A1* | 10/2014 | Canepa | | G06F 12/0246 |
| | | | | 711/103 |
| 2015/0242641 A1* | 8/2015 | Li | | G16Z 99/00 |
| | | | | 713/193 |
| 2016/0260481 A1* | 9/2016 | Miura | | G11C 7/1006 |
| 2017/0160988 A1* | 6/2017 | Nemoto | | G06F 3/0679 |
| 2017/0262464 A1* | 9/2017 | Lee | | G06F 16/2246 |
| 2017/0315927 A1* | 11/2017 | Loh | | G06F 12/1027 |
| 2018/0307609 A1* | 10/2018 | Qiang | | G06F 12/0875 |
| 2019/0155792 A1* | 5/2019 | Jeong | | G06F 12/06 |
| 2019/0243780 A1* | 8/2019 | Gopal | | G06F 12/0811 |
| 2020/0089784 A1* | 3/2020 | Li | | G06F 3/0608 |
| 2020/0117389 A1* | 4/2020 | Kang | | G06F 3/0656 |
| 2021/0055988 A1* | 2/2021 | Kim | | G06F 11/1068 |
| 2022/0276785 A1* | 9/2022 | Deguchi | | G06F 3/0659 |
| 2022/0405243 A1* | 12/2022 | Aithal | | G06F 16/164 |
| 2023/0125833 A1* | 4/2023 | Gu | | G06F 11/2094 |
| | | | | 707/610 |
| 2023/0325093 A1* | 10/2023 | Kim | | G06F 3/0659 |
| 2024/0184483 A1* | 6/2024 | Kim | | G06F 3/0644 |

\* cited by examiner

*SPO Recovery*

FIG.8

STORAGE DEVICE FOR COMPRESSING AND STORING JOURNAL, AND OPERATING METHOD THEREOF

CROSS-REFERENCE TO RELATED APPLICATION

The present application claims priority under 35 U.S.C. 119(a) to Korean patent application number 10-2023-0043278 filed on Apr. 3, 2023, which is incorporated herein by reference in its entirety.

TECHNICAL FIELD

Embodiments of the present disclosure relate to a storage device for compressing and storing a journal, and an operating method thereof.

BACKGROUND

A storage device is a device for storing data according to a request from an external device such as a computer, a mobile terminal such as a smart phone or tablet, or the like.

A storage device may further include a memory for storing data therein and a controller for controlling the memory. The memory may be a volatile memory or a non-volatile memory. The controller may receive a command from an external device (i.e., a host), and execute or control operations to read, write, or erase data in the memory included in the storage device according to the received command.

In order to maintain consistency of data stored in the memory, the storage device may store a journal for recording changes in meta data corresponding to data in a specific area of the memory. The journal stored in the memory may be used to recover meta data after a sudden power-off (SPO) occurs.

SUMMARY

Embodiments of the present disclosure may provide a storage device capable of minimizing a size of space for storing the journals, and an operating method thereof.

In one aspect, embodiments of the present disclosure may provide a storage device including a memory configured to store data, and a controller configured to generate a plurality of journals corresponding to the data, each of the plurality of journals including a logical address area index, an old physical address area index and a new physical address area index, generate a compression journal based on N target journals (N is a natural number of 2 or greater) among the plurality of journals, and store the compression journal in the memory. In this case, the N target journals may have a same new physical address area index, and the compression journal may include the same new physical address area index.

In another aspect, embodiments of the present disclosure may provide an operating method of a storage device including determining N target journals (N is a natural number of 2 or greater) from among a plurality of journals corresponding to data, generating a compression journal based on the N target journals, and storing the compression journal in a memory in which the data is stored. In this case, each of the plurality of journals may include a logical address area index, an old physical address area index, and a new physical address area index. In addition, the N target journals may have a same new physical address area index, and the compression journal may include the same new physical address area index.

In another aspect, embodiments of the present disclosure may provide a storage device including a memory configured to store data, and a controller configured to generate a compression journal using target journals having a same updated physical address area index, among a plurality of journals corresponding to the data.

According to embodiments of the present disclosure, it is possible to improve the performance and reliability of a storage device by minimizing the size of a space used to store the journals.

DETAILED DESCRIPTION

Hereinafter, embodiments of the present disclosure are described in detail with reference to the accompanying drawings. Throughout this specification, reference to "an embodiment," "another embodiment" or the like is not necessarily to only one embodiment, and different references to any such phrase are not necessarily to the same embodiment(s). The term "embodiments" when used herein does not necessarily refer to all embodiments.

Various embodiments of the present invention are described below in more detail with reference to the accompanying drawings. However, the present invention may be embodied in different forms and variations, and should not be construed as being limited to the embodiments set forth herein. Rather, the described embodiments are provided so that this disclosure will be thorough and complete, and will fully convey the present invention to those skilled in the art to which this invention pertains. Throughout this disclosure, like reference numerals refer to like parts throughout the various figures and embodiments of the present invention.

The methods, processes, and/or operations described herein may be performed by code or instructions to be executed by a computer, processor, controller, or other signal processing device. The computer, processor, controller, or other signal processing device may be those described herein or one in addition to the elements described herein. Since the algorithms that form the basis of the methods (or operations of the computer, processor, controller, or other signal processing device) are described in detail, the code or instructions for implementing the operations of the method embodiments may transform the computer, processor, controller, or other signal processing device into a special-purpose processor for performing methods herein.

When implemented at least partially in software, the controllers, processors, devices, modules, units, multiplexers, logic, interfaces, decoders, drivers, generators and other signal generating and signal processing features may include, for example, a memory or other storage device for storing code or instructions to be executed, for example, by a computer, processor, microprocessor, controller, or other signal processing device.

Figure 1:
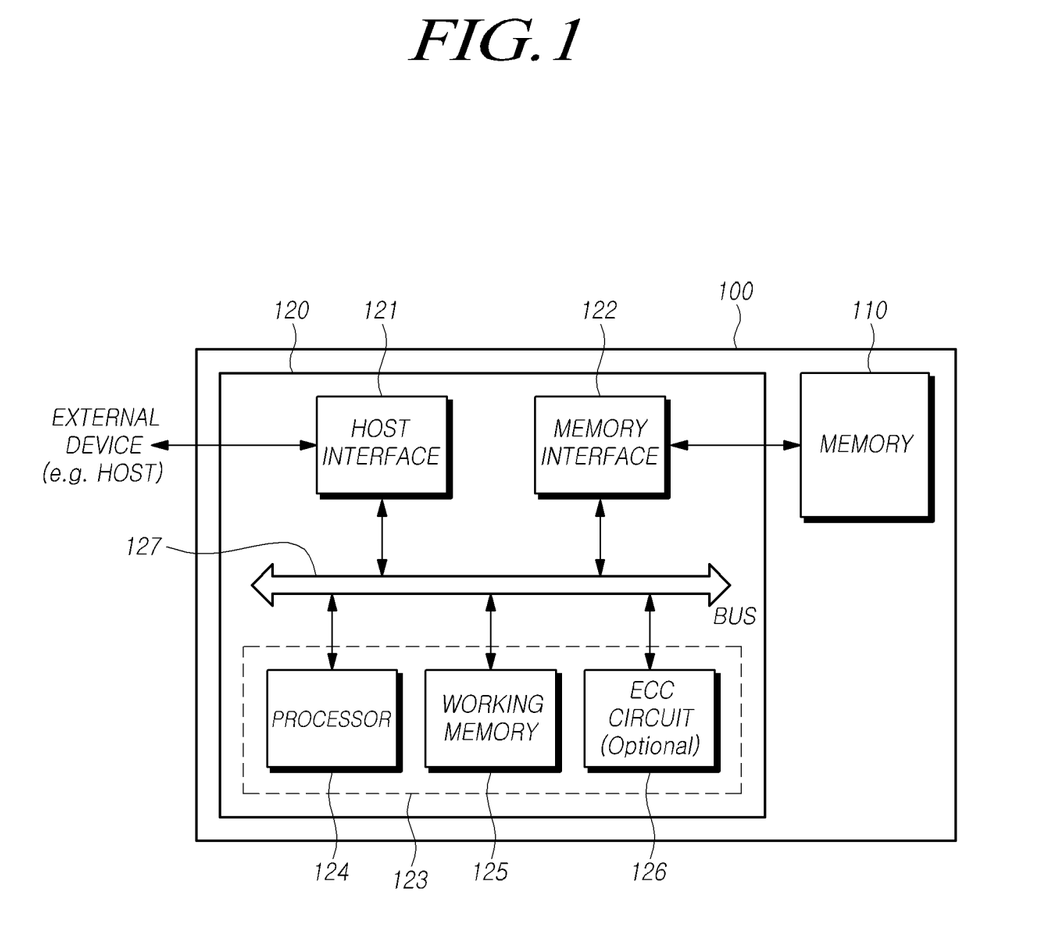
FIG. 1 is a block diagram illustrating a configuration of a storage device according to an embodiment of the present disclosure.

FIG. 1 is a block diagram illustrating a configuration of a storage device 100 according to an embodiment of the present disclosure.

Referring to FIG. 1, the storage device 100 may include a memory 110 that stores data and a controller 120 that controls the memory 110.

The memory 110 may include a plurality of memory blocks, and operates under the control of the controller 120. Operations of the memory 110 may include, for example, a read operation, a program operation (also referred to as a write operation) and an erase operation.

The memory 110 may include a memory cell array including a plurality of memory cells (also simply referred to as "cells") that store data.

For example, the memory 110 may be realized in various types of memory such as a DDR SDRAM (double data rate synchronous dynamic random access memory), an LPDDR4 (low power double data rate 4) SDRAM, a GDDR (graphics double data rate) SDRAM, an LPDDR (low power DDR), an RDRAM (Rambus dynamic random access memory), a NAND flash memory, a 3D NAND flash memory, a NOR flash memory, a resistive random access memory (RRAM), a phase-change memory (PRAM), a magnetoresistive random access memory (MRAM), a ferroelectric random access memory (FRAM) and a spin transfer torque random access memory (STT-RAM).

The memory 110 may be implemented as a three-dimensional array structure. For example, embodiments of the present disclosure may be applied to a charge trap flash (CTF) in which a charge storage layer is configured by a dielectric layer and a flash memory in which a charge storage layer is configured by a conductive floating gate.

The memory 110 may receive a command and an address from the controller 120 and may access an area in the memory cell array, which is selected by the address. The memory 110 may perform an operation instructed by the command, on the area selected by the address. The memory 110 may perform a program operation, a read operation or an erase operation. For example, when performing the program operation, the memory 110 may program data to the area selected by the address. When performing the read operation, the memory 110 may read data from the area selected by the address. In the erase operation, the memory 110 may erase data stored in the area selected by the address.

The controller 120 may control write (program), read, erase and background operations for the memory 110. For example, background operations may include at least one of a garbage collection (GC) operation, a wear leveling (WL) operation, a read reclaim (RR) operation, a bad block management (BBM) operation, and so forth.

The controller 120 may control the operation of the memory 110 according to a request from an external device (e.g., a host) located outside the storage device 100. The controller 120, however, also may control the operation of the memory 110 regardless of a request of the host.

The host may be a computer, an ultra mobile PC (UMPC), a workstation, a personal digital assistant (PDA), a tablet, a mobile phone, a smartphone, an e-book, a portable multimedia player (PMP), a portable game player, a navigation device, a black box, a digital camera, a digital multimedia broadcasting (DMB) player, a smart television, a digital audio recorder, a digital audio player, a digital picture recorder, a digital picture player, a digital video recorder, a digital video player, a storage configuring a data center, one of various electronic devices configuring a home network, one of various electronic devices configuring a computer network, one of various electronic devices configuring a telematics network, an RFID (radio frequency identification) device, and a mobility device (e.g., a vehicle, a robot or a drone) capable of driving under human control or autonomous driving, as non-limiting examples. Alternatively, the host may be a virtual reality (VR) device providing 2D or 3D virtual reality images or an augmented reality (AR) device providing augmented reality images. The host may be any of various electronic devices that require the storage device 100 capable of storing data.

The host may include at least one operating system (OS). The operating system may generally manage and control the function and operation of the host, and may provide interoperability between the host and the storage device 100. The operating system may be classified into a general operating system and a mobile operating system depending on the mobility of the host.

The controller 120 and the host may be devices that are separated from each other, or the controller 120 and the host may be integrated into a single device. Hereunder, for the sake of convenience, descriptions will describe the controller 120 and the host as devices that are separated from each other.

Referring to FIG. 1, the controller 120 may include a memory interface 122, a control circuit 123, and a host interface 121.

The host interface 121 may provide an interface for communication with the host. For example, the host interface 121 provides an interface that uses at least one of various communication standards or interfaces such as a USB (universal serial bus) protocol, an MMC (multimedia card) protocol, a PCI (peripheral component interconnection) protocol, a PCI-E (PCI-express) protocol, an ATA (advanced technology attachment) protocol, a serial-ATA protocol, a parallel-ATA protocol, an SCSI (small computer system interface) protocol, an ESDI (enhanced small disk interface) protocol, an IDE (integrated drive electronics) protocol and a private protocol.

When receiving a command from the host, the control circuit 123 may receive the command through the host interface 121, and may perform an operation of processing the received command.

The memory interface 122 may be coupled with the memory 110 to provide an interface for communication with the memory 110. That is, the memory interface 122 may provide an interface between the memory 110 and the controller 120 under the control of the control circuit 123.

The control circuit 123 may perform the general control operations of the controller 120 to control the operation of the memory 110. To this end, for instance, the control circuit 123 may include at least one of a processor 124 and a working memory 125, and may further include an error detection and correction circuit (ECC circuit) 126.

The processor 124 may control general operations of the controller 120, and may perform a logic calculation. The processor 124 may communicate with the host through the host interface 121, and may communicate with the memory 110 through the memory interface 122.

The processor 124 may perform the function of a flash translation layer (FTL). The processor 124 may translate a logical block address (LBA), provided by the host, into a physical block address (PBA) through the flash translation layer (FTL). The flash translation layer (FTL) may receive the logical block address (LBA) and translate the logical block address (LBA) into the physical block address (PBA), by using a mapping table.

There are various address mapping methods of the flash translation layer, depending on a mapping unit. Representative address mapping methods include a page mapping method, a block mapping method and a hybrid mapping method.

The processor 124 may randomize data received from the host. For example, the processor 124 may randomize data received from the host by using a set randomizing seed. The randomized data may be provided to the memory 110, and may be programmed to a memory cell array of the memory 110.

In a read operation, the processor 124 may derandomize data received from the memory 110. For example, the processor 124 may derandomize data received from the memory 110 by using a derandomizing seed. The derandomized data may be outputted to the host.

The processor 124 may execute firmware to control the operation of the controller 120. Namely, in order to control the general operation of the controller 120 and perform a logic calculation, the processor 124 may execute (drive) firmware loaded in the working memory 125 upon booting. Hereafter, an operation of the storage device 100 according to embodiments of the present disclosure will be described as implementing a processor 124 that executes firmware in which the corresponding operation is defined.

Firmware, which is a program to be executed in the storage device 100 to drive the storage device 100, may include various functional layers. For example, the firmware may include binary data in which codes for executing the functional layers, respectively, are defined.

For example, the firmware may include at least one of a flash translation layer (FTL), which performs a translating function between a logical address requested to the storage device 100 from the host and a physical address of the memory 110; a host interface layer (HIL), which serves to analyze a command requested to the storage device 100 as a storage device from the host and transfer the command to the flash translation layer (FTL); and a flash interface layer (FIL), which transfers a command, instructed from the flash translation layer (FTL), to the memory 110.

Such firmware may be loaded in the working memory 125 from, for example, the memory 110 or a separate nonvolatile memory (e.g., a ROM or a NOR Flash) located outside the memory 110. The processor 124 may first load all or a part of the firmware in the working memory 125 when executing a booting operation after power-on.

The processor 124 may perform a logic calculation, which is defined in the firmware loaded in the working memory 125, to control the general operation of the controller 120. The processor 124 may store a result of performing the logic calculation defined in the firmware, in the working memory 125. The processor 124 may control the controller 120 according to a result of performing the logic calculation defined in the firmware such that the controller 120 generates a command or a signal. When a part of firmware, in which a logic calculation is to be performed is defined, is stored in the memory 110, but not loaded in the working memory 125, the processor 124 may generate an event (e.g., an interrupt) for loading the corresponding part of the firmware into the working memory 125 from the memory 110.

The processor 124 may load metadata used for driving firmware from the memory 110. The metadata, which is data for managing the memory 110, may include, for example, management information on user data stored in the memory 110.

Firmware may be updated while the storage device 100 is manufactured or while the storage device 100 is operating. The controller 120 may download new firmware from the outside of the storage device 100 and update existing firmware with the new firmware.

To drive the controller 120, the working memory 125 may store firmware, a program code, a command and data. The working memory 125 may be a volatile memory that includes, for example, at least one of an SRAM (static RAM), a DRAM (dynamic RAM) and an SDRAM (synchronous DRAM).

The error detection and correction circuit 126 may detect an error bit of target data, and correct the detected error bit by using an error correction code. The target data may be, for example, data stored in the working memory 125 or data read from the memory 110.

The error detection and correction circuit 126 may decode data by using an error correction code. The error detection and correction circuit 126 may be realized by various code decoders. For example, a decoder that performs unsystematic code decoding or a decoder that performs systematic code decoding may be used.

For example, the error detection and correction circuit 126 may detect an error bit by the unit of a set sector in each of the read data, when each read data is constituted by a plurality of sectors. A sector may mean a data unit that is smaller than a page, which is the read unit of a flash memory. Sectors constituting each read data may be matched with one another using an address.

The error detection and correction circuit 126 may calculate a bit error rate (BER), and may determine whether an error is correctable or not, by sector units. For example, when a bit error rate (BER) is higher than a reference value, the error detection and correction circuit 126 may determine that a corresponding sector is uncorrectable or a fail. On the other hand, when a bit error rate (BER) is lower than the reference value, the error detection and correction circuit 126 may determine that a corresponding sector is correctable or a pass.

The error detection and correction circuit 126 may perform an error detection and correction operation sequentially for all read data. In the case where a sector included in read data is correctable, the error detection and correction circuit 126 may omit an error detection and correction operation for a corresponding sector for next read data. If the error detection and correction operation for all read data is ended in this way, then the error detection and correction circuit 126 may detect a sector which is uncorrectable in the last read data. There may be one or more sectors that are determined to be uncorrectable. The error detection and correction circuit 126 may transfer information (e.g., address information) regarding a sector which is determined to be uncorrectable to the processor 124.

A bus 127 may provide channels among the components 121, 122, 124, 125 and 126 of the controller 120. The bus 127 may include, for example, a control bus for transferring various control signals, commands and the like, a data bus for transferring various data, and so forth.

Some components among the above-described components 121, 122, 124, 125 and 126 of the controller 120 may be omitted, or some components among the above-described components 121, 122, 124, 125 and 126 of the controller 120 may be integrated into one component. In addition to the above-described components 121, 122, 124, 125 and 126 of the controller 120, one or more other components may be added.

Hereinbelow, the memory 110 will be described in further detail with reference to FIG. 2.

Figure 2:
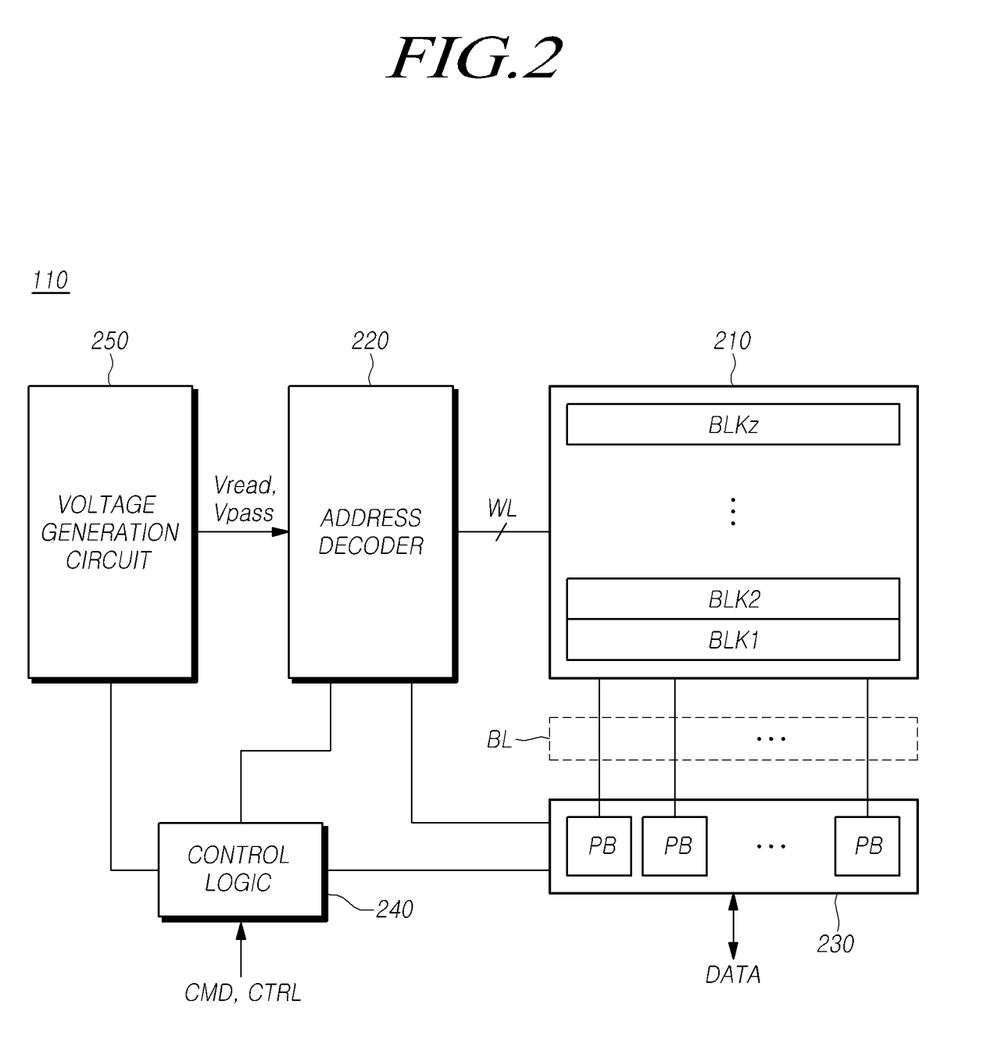
FIG. 2 is a block diagram illustrating in detail a memory of FIG. 1.

FIG. 2 is a block diagram illustrating in detail the memory 110 of FIG. 1.

Referring to FIG. 2, the memory 110 according to an embodiment of the present disclosure may include a memory cell array 210, an address decoder 220, a read and write circuit 230, a control logic 240, and a voltage generation circuit 250.

The memory cell array 210 may include a plurality of memory blocks BLK1 to BLKz, where z is a natural number of 2 or greater.

In the plurality of memory blocks BLK1 to BLKz, a plurality of word lines WL and a plurality of bit lines BL may be disposed, and a plurality of memory cells may be arranged.

The plurality of memory blocks BLK1 to BLKz may be coupled with the address decoder 220 through the plurality of word lines WL. The plurality of memory blocks BLK1 to BLKz may be coupled with the read and write circuit 230 through the plurality of bit lines BL.

Each of the plurality of memory blocks BLK1 to BLKz may include a plurality of memory cells. For example, the plurality of memory cells may be nonvolatile memory cells, and may be configured by nonvolatile memory cells that have vertical channel structures.

The memory cell array 210 may be configured by a memory cell array having a two-dimensional structure or may be configured by a memory cell array having a three-dimensional structure.

Each of the plurality of memory cells included in the memory cell array 210 may store at least 1-bit data. For instance, each of the plurality of memory cells included in the memory cell array 210 may be a single level cell (SLC) capable of storing 1-bit data. In another instance, each of the plurality of memory cells included in the memory cell array 210 may be a multi-level cell (MLC) capable of storing 2-bit data. In still another instance, each of the plurality of memory cells included in the memory cell array 210 may be a triple level cell (TLC) capable of storing 3-bit data. In yet another instance, each of the plurality of memory cells included in the memory cell array 210 may be a quad level cell (QLC) capable of storing 4-bit data. In a further instance, the memory cell array 210 may include a plurality of memory cells, each of which is capable of storing 5 or more-bit data.

The number of bits of data stored in each of the plurality of memory cells may be dynamically determined. For example, a single-level cell capable of storing 1-bit data may be changed to a triple-level cell capable of storing 3-bit data.

Referring to FIG. 2, the address decoder 220, the read and write circuit 230, the control logic 240 and the voltage generation circuit 250 may operate as a peripheral circuit that drives the memory cell array 210.

The address decoder 220 may be coupled to the memory cell array 210 through the plurality of word lines WL.

The address decoder 220 may operate under the control of the control logic 240.

The address decoder 220 may receive an address through an input/output buffer in the memory 110. The address decoder 220 may decode a block address in the received address. The address decoder 220 may select at least one memory block depending on the decoded block address.

The address decoder 220 may receive a read voltage Vread and a pass voltage Vpass from the voltage generation circuit 250.

The address decoder 220 may apply the read voltage Vread to a selected word line WL in a selected memory block during a read operation, and may apply the pass voltage Vpass to the remaining unselected word lines WL.

The address decoder 220 may apply a verify voltage generated in the voltage generation circuit 250 to a selected word line WL in a selected memory block in a program verify operation, and may apply the pass voltage Vpass to the remaining unselected word lines WL.

The address decoder 220 may decode a column address in the received address. The address decoder 220 may transmit the decoded column address to the read and write circuit 230.

A read operation and a program operation of the memory 110 may be performed by the unit of a page. An address received when a read operation or a program operation is requested may include at least one of a block address, a row address and a column address.

The address decoder 220 may select one memory block and one word line depending on a block address and a row address. A column address may be decoded by the address decoder 220 and be provided to the read and write circuit 230.

The address decoder 220 may include at least one of a block decoder, a row decoder, a column decoder and an address buffer.

The read and write circuit 230 may include a plurality of page buffers PB. The read and write circuit 230 may operate as a read circuit in a read operation of the memory cell array 210, and may operate as a write circuit in a write operation of the memory cell array 210.

The read and write circuit 230 described above may also be referred to as a page buffer circuit or a data register circuit that includes a plurality of page buffers PB. The read and write circuit 230 may include data buffers that take charge of a data processing function, and may further include cache buffers that take charge of a caching function.

The plurality of page buffers PB may be coupled to the memory cell array 210 through the plurality of bit lines BL. The plurality of page buffers PB may continuously supply sensing current to bit lines BL coupled with memory cells to sense threshold voltages (Vth) of the memory cells in a read operation and a program verify operation, and may latch sensing data by sensing, through sensing nodes, changes in the amounts of current flowing, depending on the programmed states of the corresponding memory cells.

The read and write circuit 230 may operate in response to page buffer control signals outputted from the control logic 240.

In a read operation, the read and write circuit 230 temporarily stores read data by sensing data of memory cells, and then, outputs data DATA to the input/output buffer of the memory 110. In an embodiment, the read and write circuit 230 may include a column select circuit in addition to the page buffers PB or the page registers.

The control logic 240 may be coupled with the address decoder 220, the read and write circuit 230 and the voltage generation circuit 250. The control logic 240 may receive a command CMD and a control signal CTRL through the input/output buffer of the memory 110.

The control logic 240 may control general operations of the memory 110 in response to the control signal CTRL. The control logic 240 may output control signals for adjusting the precharge potential levels of the sensing nodes of the plurality of page buffers PB.

The control logic 240 may control the read and write circuit 230 to perform a read operation of the memory cell array 210. The voltage generation circuit 250 may generate the read voltage Vread and the pass voltage Vpass used in a read operation, in response to a voltage generation circuit control signal outputted from the control logic 240.

Each memory block of the memory 110 described above may be configured by a plurality of pages corresponding to a plurality of word lines WL and a plurality of strings corresponding to a plurality of bit lines BL.

In a memory block BLK, a plurality of word lines WL and a plurality of bit lines BL may be disposed to intersect with each other. For example, each of the plurality of word lines WL may be disposed in a row direction, and each of the plurality of bit lines BL may be disposed in a column direction. In another example, each of the plurality of word lines WL may be disposed in a column direction, and each of the plurality of bit lines BL may be disposed in a row direction.

A memory cell may be coupled to one of the plurality of word lines WL and one of the plurality of bit lines BL. A transistor may be disposed in each memory cell.

For example, a transistor disposed in each memory cell may include a drain, a source and a gate. The drain (or source) of the transistor may be coupled with a corresponding bit line BL directly or via another transistor. The source (or drain) of the transistor may be coupled with a source line (which may be the ground) directly or via another transistor. The gate of the transistor may include a floating gate, which is surrounded by a dielectric, and a control gate to which a gate voltage is applied from a word line WL.

In each memory block, a first select line (also referred to as a source select line or a drain select line) may be additionally disposed outside a first outermost word line more adjacent to the read and write circuit 230 between two outermost word lines, and a second select line (also referred to as a drain select line or a source select line) may be additionally disposed outside a second outermost word line between the two outermost word lines.

At least one dummy word line may be additionally disposed between the first outermost word line and the first select line. At least one dummy word line may also be additionally disposed between the second outermost word line and the second select line.

A read operation and a program operation (write operation) of the memory block described above may be performed by the unit of a page, and an erase operation may be performed by the unit of a memory block.

Figure 3:
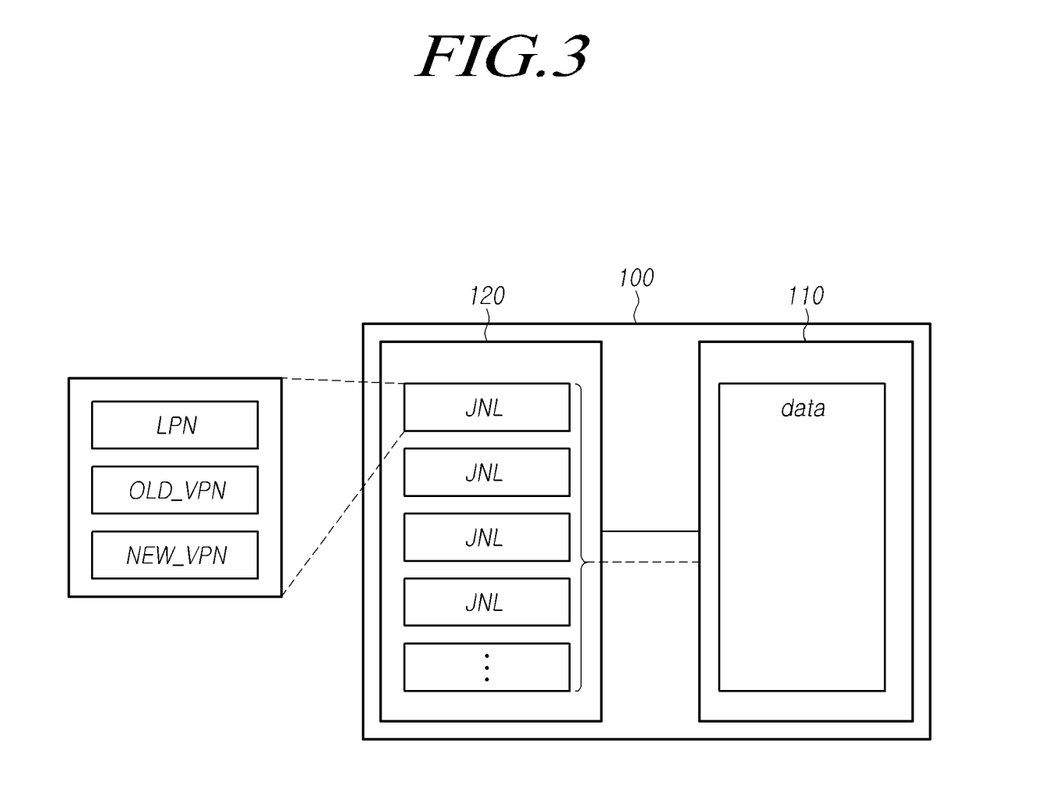
FIG. 3 is a diagram illustrating a schematic configuration of a storage device according to embodiments of the present disclosure.

FIG. 3 is a diagram illustrating a schematic configuration of the storage device 100 according to embodiments of the present disclosure.

Referring to FIG. 3, the storage device 100 may include the memory 110 and the controller 120.

For example, the memory 110 may store data.

The controller 120 may create (i.e., generate) a plurality of journals JNL corresponding to data stored in the memory 110.

A new journal may be created whenever meta data corresponding to data is changed as new data is added to the memory 110 or data stored in the memory 110 is moved, modified, or deleted.

Each of the plurality of journals JNL may include a logical address area index LPN, an old physical address area index OLD_VPN, and a new physical address area index (i.e., an updated physical address area index) NEW_VPN.

The logical address area index LPN of a journal may indicate a logical address area corresponding to a logical address of data corresponding to the corresponding journal. In this case, the size of the logical address area may be, for example, a multiple of the size of the page.

The old physical address area index OLD_VPN of the journal may indicate a physical address area corresponding to a physical address before change of data corresponding to the corresponding journal. In this case, the size of the physical address area may be the same as the size of the logical address area.

The new physical address area index NEW_VPN of a journal may indicate a physical address area corresponding to a physical address after change of data corresponding to the corresponding journal.

The controller 120 may determine N target journals from among the plurality of generated journals JNL, and create (i.e., generate) a compression journal based on the determined N target journals. Hereinafter, this will be described in detail in FIG. 4.

Figure 4:
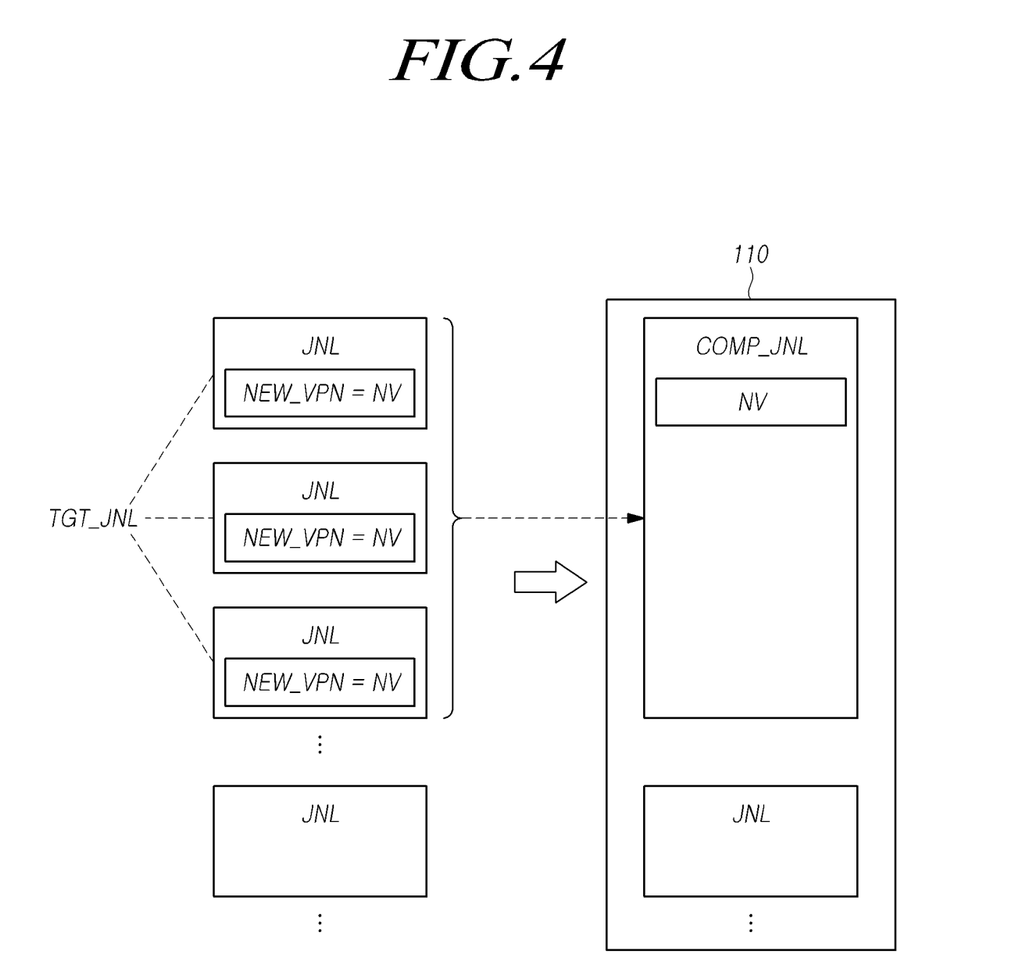
FIG. 4 is a diagram for describing an operation of creating a compression journal by a storage device according to embodiments of the present disclosure.

FIG. 4 is a diagram for describing an operation of creating a compression journal COMP_JNL by the storage device 100 according to embodiments of the present disclosure.

Referring to FIG. 4, the controller 120 of the storage device 100 may create a compression journal COMP_JNL based on N target journals TGT_JNL from among the plurality of journals JNL. In addition, the controller 120 may store the created compression journal COMP_JNL in the memory 110. After the compression journal COMP_JNL is stored in the memory 110, the target journals TGT_JNL may be deleted without being stored in the memory 110.

In this case, the new physical address area indexes NEW_VPN of the target journals TGT_JNL may be the same. In FIG. 4, the new physical address area indexes NEW_VPN of the target journals TGT_JNL are all the same NVs.

In addition, the compression journal COMP_JNL may include the same new physical address area index NV.

The size of the compression journal COMP_JNL may be smaller than the sum of the sizes of the target journals TGT_JNL. Accordingly, the size of a space used to store the journal may be reduced by compressing the target journals TGT_JNL into the compression journal COMP_JNL. As a result, the performance and reliability of the storage device 100 may be improved.

Meanwhile, N, which is the number of target journals TGT_JNL, may be determined in various ways.

For example, N may be determined based on the size of data corresponding to each of the plurality of journals JNL and the maximum size of data which can be simultaneously written to the memory 110. For example, if the maximum size of data capable of being simultaneously written to the memory 110 is S1 (e.g., 64 KB) and the size of data corresponding to each of the plurality of journals JNL is S2 (e.g., 4 KB), N may be S1/S2 (e.g., 64 KB/4 KB=16).

As another example, N may be a preset value or a randomly determined value.

A detailed structure of the compression journal COMP_JNL will be described below.

Figure 5:
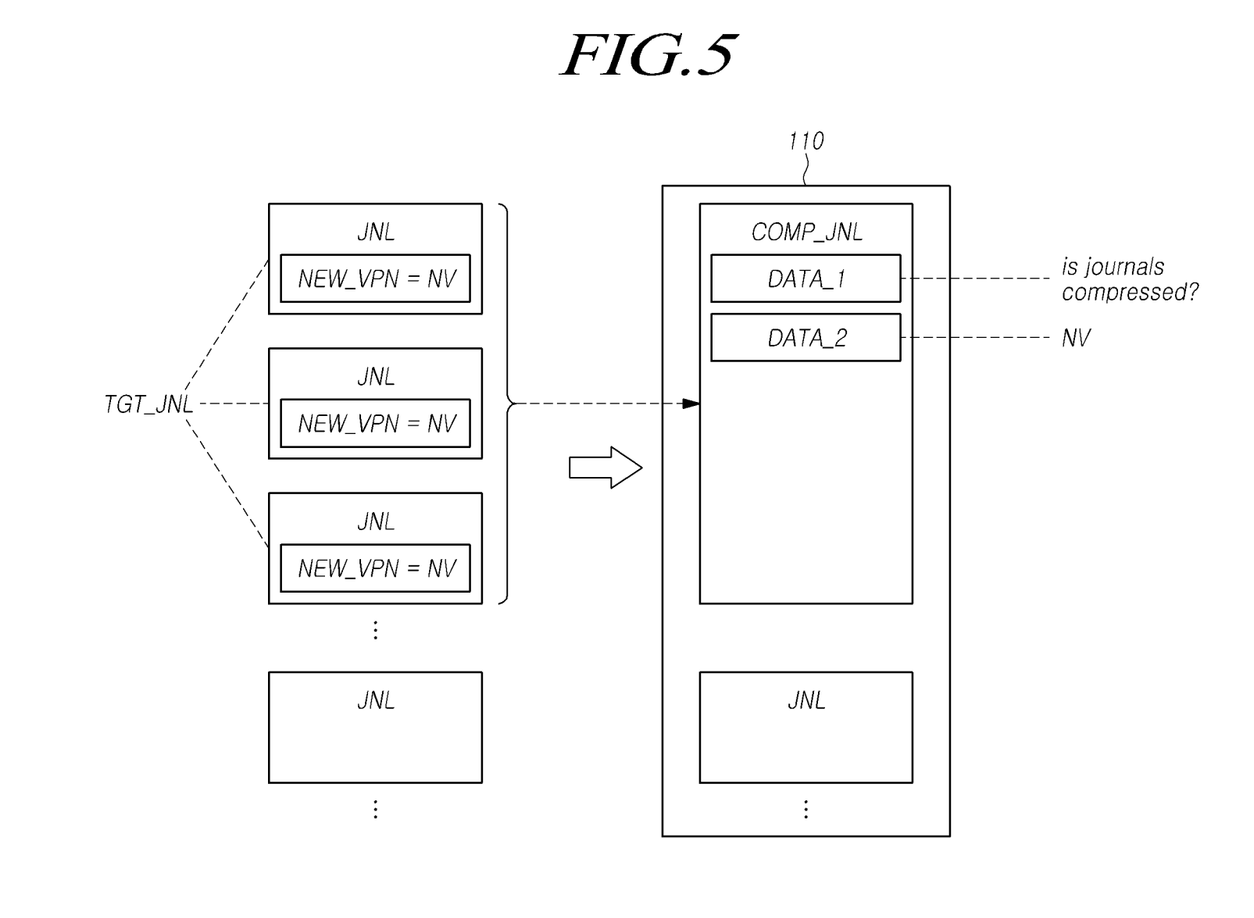
FIG. 5 is a diagram for describing first data and second data included in a compression journal according to embodiments of the present disclosure.

FIG. 5 is a diagram for describing first data DATA_1 and second data DATA_2 included in a compression journal COMP_JNL according to embodiments of the present disclosure.

Referring to FIG. 5, the compression journal COMP_JNL may include first data DATA_1 indicating that the target journals TGT_JNL are compressed.

The first data DATA_1 may be located in a preset area on the compression journal COMP_JNL. For example, the first data DATA_1 may be located at the most significant bit of the compression journal COMP_JNL.

In addition, the compression journal COMP_JNL may include second data DATA_2 indicating the same new physical address area index NEW_VPN. As described above, since the new physical address area indexes NEW_VPN of the target journals TGT_JNL are the same, the new physical address area index NEW_VPN for all of the target journals TGT_JNL may be indicated by the second data DATA_2. The value of the second data DATA_2 may be same as the value of the new physical address area index NEW_VPN of the target journals TGT_JNL.

In FIG. 5, the new physical address area indexes NEW_VPN of the target journals TGT_JNL are all NVs. Accordingly, the second data DATA_2 may be NV.

Figure 6:
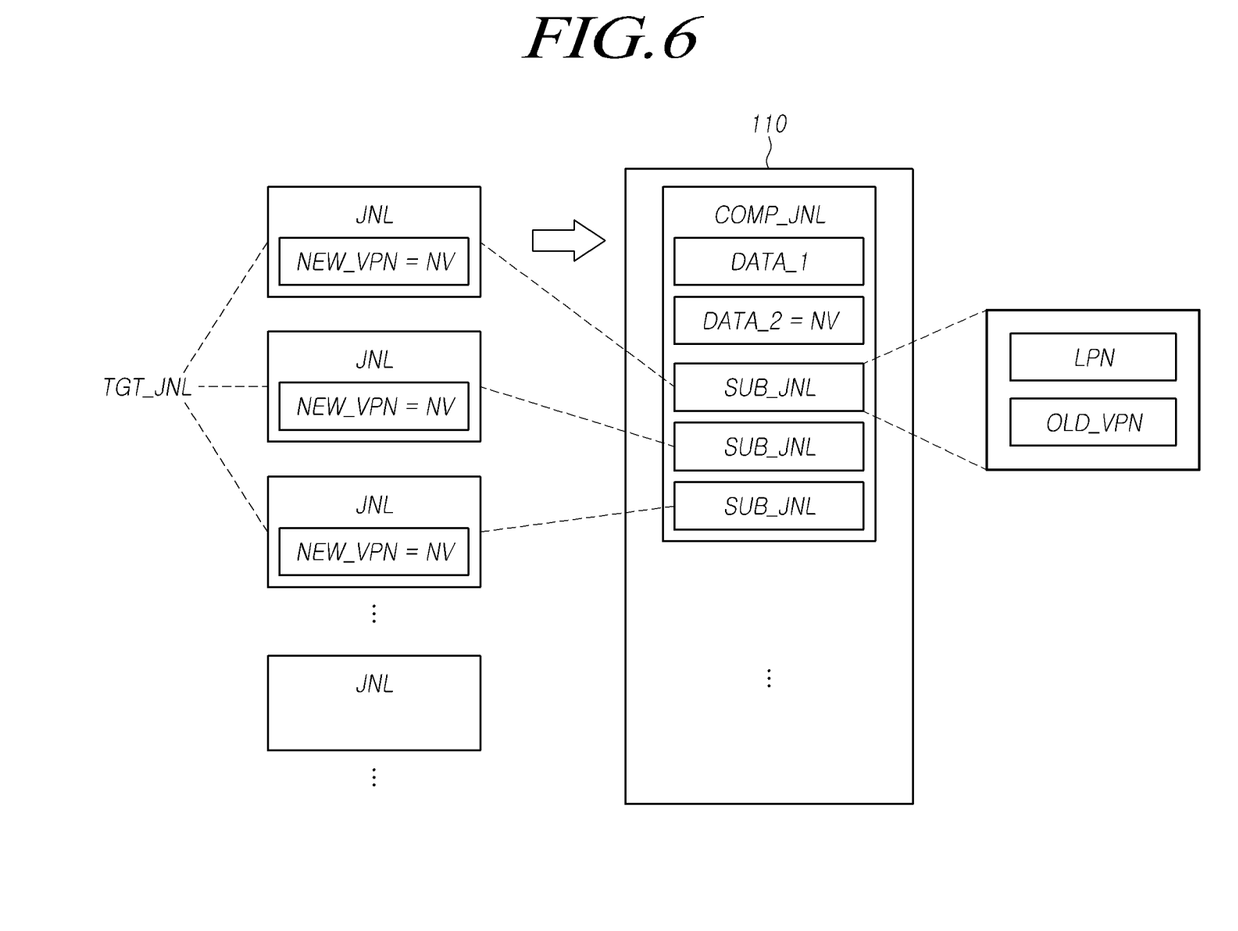
FIG. 6 is a diagram for describing sub-journals included in a compression journal according to embodiments of the present disclosure.

FIG. 6 is a diagram for describing sub-journals SUB_JNL included in a compression journal COMP_JNL according to embodiments of the present disclosure.

Referring to FIG. 6, the compression journal COMP_JNL may further include, in addition to the first data DATA_1 and second data DATA_2, N sub-journals SUB_JNL corresponding to each of the N target journals TGT_JNL.

In this case, each of the N sub-journals SUB_JNL may include a logical address area index LPN and an old physical address area index OLD_VPN of a corresponding target journal.

However, each sub-journal may not or does not include a new physical address area index NEW_VPN. This is because NV, which is the value of the new physical address area index of the target journal corresponding to each sub-journal, is already stored in the second data DATA_2.

Figure 7:
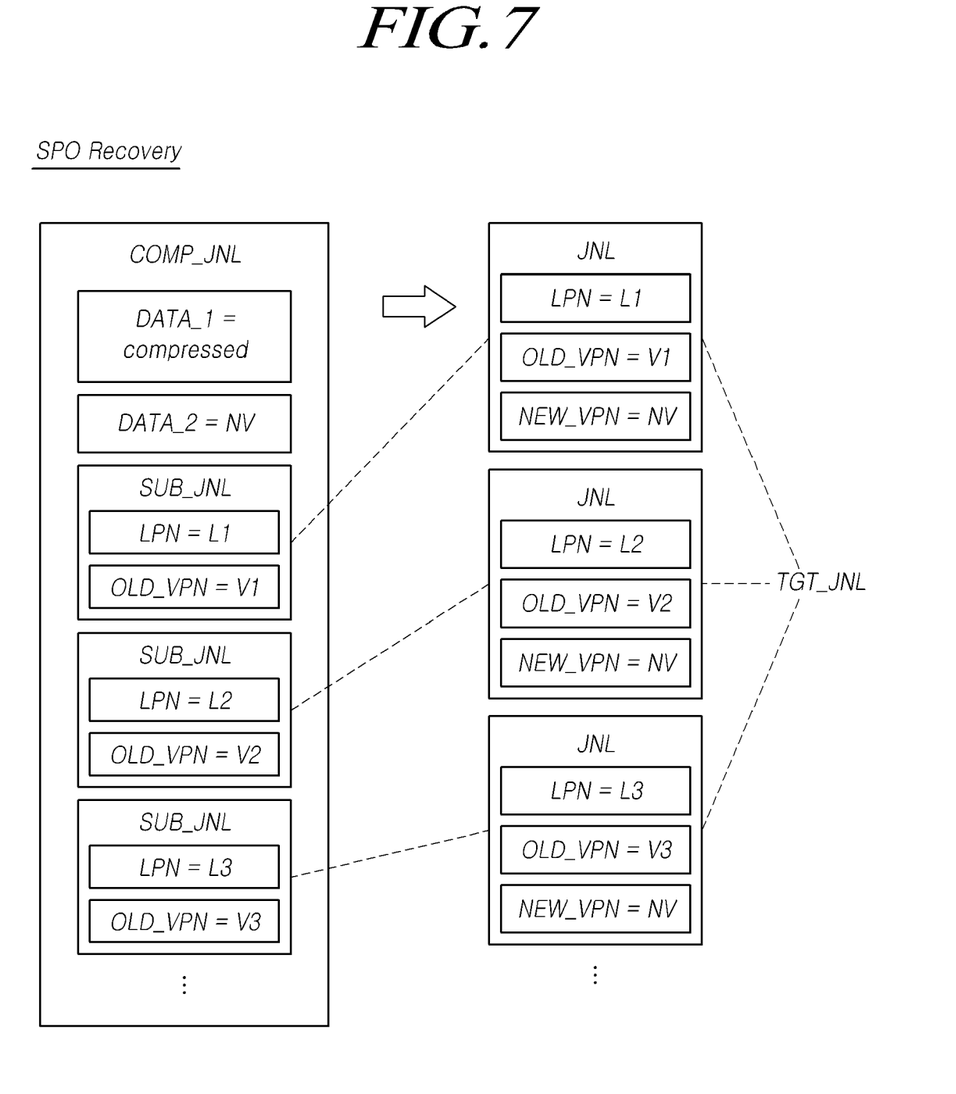
FIG. 7 is a diagram for describing an operation of recovering target journals based on a compression journal by a storage device according to embodiments of the present disclosure.

FIG. 7 is a diagram for describing an operation of recovering target journals TGT_JNL based on a compression journal COMP_JNL by a storage device 100 according to embodiments of the present disclosure. Referring to FIG. 7, when executing a recovery operation for a sudden power-off (SPO), the controller 120 of the storage device 100 may recover or restore target journals TGT_JNL based on the compression journal COMP_JNL.

In the case that the storage device 100 is powered on after the SPO occurrence, the controller 120 may read journals stored in the memory 110 to execute a recovery operation for the SPO. In this case, since the target journals TGT_JNL are compressed into the compression journal COMP_JNL, the controller 120 may first recover the target journals TGT_JNL based on the compression journal COMP_JNL.

First, the controller 120 may check the first data DATA_1 of the compression journal COMP_JNL to determine whether one or more journals are compressed and stored in the compression journal COMP_JNL.

In addition, the controller 120 may recover the target journals TGT_JNL based on the second data DATA_2 stored in the compression journal COMP_JNL and the plurality of sub-journals SUB_JNL.

In this case, the second data DATA_2 may be used to recover the new physical address area index NEW_VPN of the target journals TGT_JNL, and the value of the second data DATA_2 may be NV.

First, the controller 120 may create, by using the second data DATA_2 and a sub-journal with a logical address area index LPN of L1 and an old physical address area index OLD_VPN of V1, a target journal with a logical address area index LPN of L1, an old physical address area index OLD_VPN of V1, and a new physical address area index NEW_VPN of NV.

In addition, the controller 120 may create, by using the second data DATA_2 and a sub-journal with a logical address area index LPN of L2 and an old physical address area index OLD_VPN of V2, a target journal with a logical address area index LPN of L2, an old physical address area index OLD_VPN of V2, and a new physical address area index NEW_VPN of NV.

Further, the controller 120 may create, by using the second data DATA_2 and a sub-journal with a logical address area index LPN of L3 and an old physical address area index OLD_VPN of V3, a target journal with a logical address area index LPN of L3, an old physical address area index OLD_VPN of V3, and a new physical address area index NEW_VPN of NV.

Figure 8:
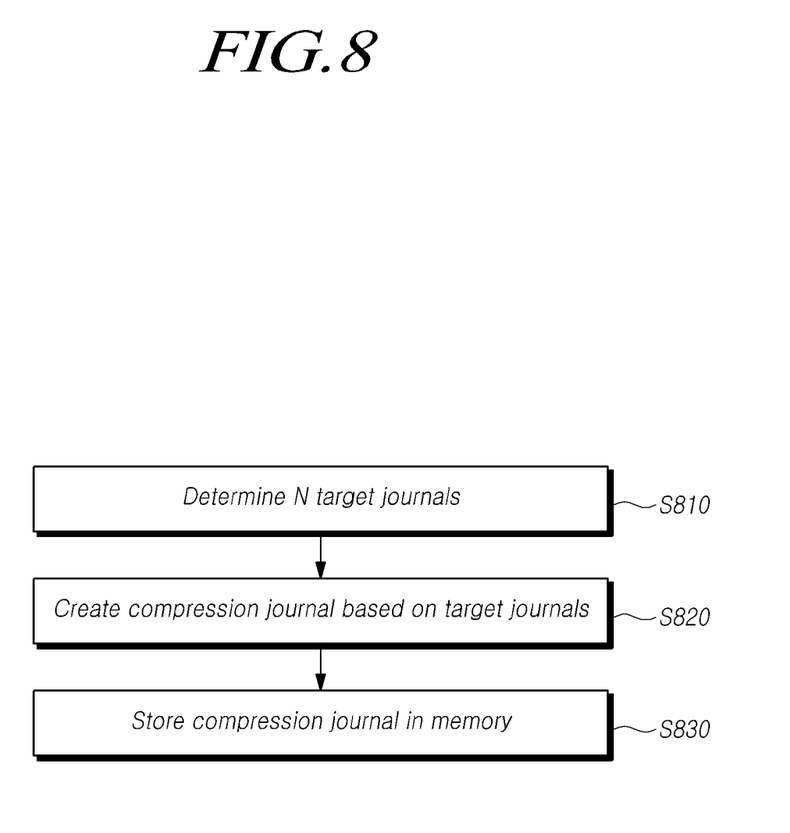
FIG. 8 is a flowchart for describing an operating method of a storage device according to embodiments of the present disclosure.

FIG. 8 is a flowchart for describing an operating method of the storage device 100 according to embodiments of the present disclosure.

Referring to FIG. 8, an operating method of the storage device 100 may include determining N target journals TGT_JNL among a plurality of journals JNL corresponding to data, where N is a natural number of 2 or greater (operation S810).

In this case, each of the plurality of journals JNL may include a logical address area index LPN, an old physical address area index OLD_VPN, and a new physical address area index NEW_VPN. In addition, the new physical address area indexes NEW_VPN of the target journals TGT_JNL may be identical to each other.

Meanwhile, N may be determined based on the size of data corresponding to each of the plurality of journals JNL and the maximum size of data which can be simultaneously written to the memory 110 storing the plurality of journals JNL.

In addition, the operating method of the storage device 100 may include creating a compression journal COMP_JNL based on the N target journals TGT_JNL determined in the operation S810 (operation S820). The compression journal COMP_JNL may have the same new physical address area index NEW_VPN.

In this case, the size of the compression journal COMP_JNL may be smaller than the sum of the sizes of the target journals TGT_JNL.

For example, the compression journal COMP_JNL may include first data DATA_1 indicating that the target journals TGT_JNL are compressed, and second data DATA_2 indicating the same new physical address area index NEW_VPN.

For example, the compression journal COMP_JNL may include N sub-journals SUB_JNL corresponding to each of the target journals TGT_JNL, in addition to the first data DATA_1 and second data DATA_2. In this case, each of the N sub-journals SUB_JNL may include a logical address area index LPN and an old physical address area index OLD_VPN of a corresponding target journal.

In addition, the operating method of the storage device 100 may include storing the compression journal COMP_JNL created in the operation S820 in the memory 110 in which data is stored (operation S830).

Meanwhile, the operating method of the storage device 100 may further include recovering the target journals TGT_JNL based on the compression journal COMP_JNL when executing a recovery operation for a sudden power-off (SPO).

Although embodiments of the present disclosure have been described for illustrative purposes, those skilled in the art will appreciate that various modifications, additions and substitutions are possible, without departing from the scope and spirit of the present disclosure. Therefore, the embodiments disclosed above and in the accompanying drawings should be considered in a descriptive sense only and not for limiting the technological scope. The technological scope of the present disclosure is not limited by the embodiments and the accompanying drawings. The spirit and scope of the present disclosure should be interpreted in connection with the appended claims and encompass all equivalents falling within the scope of the appended claims. Furthermore, the embodiments may be combined to form additional embodiments.

What is claimed is:

1. A storage device comprising:
a memory configured to store data; and
a controller configured to:
generate a plurality of journals, each of the plurality of journals created whenever meta data corresponding to the data is changed, each of the plurality of journals including a logical address area index, an old physical address area index and a new physical address area index,
generate a compression journal based on N target journals among the plurality of journals, and
store the compression journal in the memory,
wherein N is a natural number of 2 or greater, and
wherein the N target journals have a same new physical address area index, and the compression journal includes the same new physical address area index.

2. The storage device of claim 1, wherein a size of the compression journal is smaller than a sum of sizes of the N target journals.

3. The storage device of claim 1, wherein N is determined based on a size of data corresponding to each of the plurality of journals and a maximum size of data capable of being simultaneously written to the memory.

4. The storage device of claim 1, wherein the compression journal includes first data indicating whether the N target journals are compressed, and second data indicating the same new physical address area index.

5. The storage device of claim 4,
wherein the compression journal further includes N sub-journals corresponding to the N target journals, respectively,
wherein each of the N sub-journals includes a logical address area index and an old physical address area index of a corresponding N target journal.

6. The storage device of claim 1, wherein the controller is further configured to recover, when executing a recovery operation for a sudden power-off (SPO), the N target journals based on the compression journal.

7. An operating method of a storage device, the operating method comprising:
determining N target journals from among a plurality of journals corresponding to data;
generating a compression journal based on the N target journals; and
storing the compression journal in a memory in which the data is stored,
wherein each of the plurality of journals is created whenever meta data corresponding to the data is changed,
wherein each of the plurality of journals includes a logical address area index, an old physical address area index, and a new physical address area index,
wherein N is a natural number of 2 or greater, and
wherein the N target journals have a same new physical address area index, and the compression journal includes the same new physical address area index.

8. The operating method of claim 7, wherein a size of the compression journal is smaller than a sum of sizes of the N target journals.

9. The operating method of claim 7, wherein N is determined based on a size of data corresponding to each of the plurality of journals and a maximum size of data capable of being simultaneously written to the memory.

10. The operating method of claim 7, wherein the compression journal includes first data indicating whether the N target journals are compressed, and second data indicating the same new physical address area index.

11. The operating method of claim 10, wherein the compression journal further includes N sub-journals corresponding to the N target journals, respectively,
wherein each of the N sub-journals includes a logical address area index and an old physical address area index of a corresponding N target journal.

12. The operating method of claim 7, further comprising recovering, when executing a recovery operation for a sudden power-off (SPO), the N target journals based on the compression journal.

13. A storage device comprising:
a memory configured to store data; and
a controller configured to generate a compression journal using target journals having a same updated physical address area index, among a plurality of journals corresponding to the data,
wherein each of the plurality of journals is created whenever meta data corresponding to the data is changed.

14. The storage device of claim 13, wherein the controller is further configured to generate the plurality of journals each including a logical address area index, an old physical address area index and an updated physical address area index.

15. The storage device of claim 13, wherein the compression journal includes first data indicating whether the target journals are compressed, and second data indicating the same updated physical address area index.

16. The storage device of claim 15,
wherein the compression journal further includes sub-journals corresponding to the target journals, respectively,
wherein each of the sub-journals includes the logical address area index and the old physical address area index of a corresponding target journal.

17. The storage device of claim 1, wherein each of the plurality of journals includes only the logical address area index, the old physical address area index and the new physical address area index.

18. The operating method of claim 7, wherein each of the plurality of journals includes only the logical address area index, the old physical address area index and the new physical address area index.

19. The storage device of claim 13, wherein each of the plurality of journals includes only the logical address area index, the old physical address area index and the new physical address area index.

20. The storage device of claim 1, wherein the same new physical address area index corresponds to a physical address storing the data after the data is changed.

\* \* \* \* \*